United States Patent Office 3,433,613
Patented Mar. 18, 1969

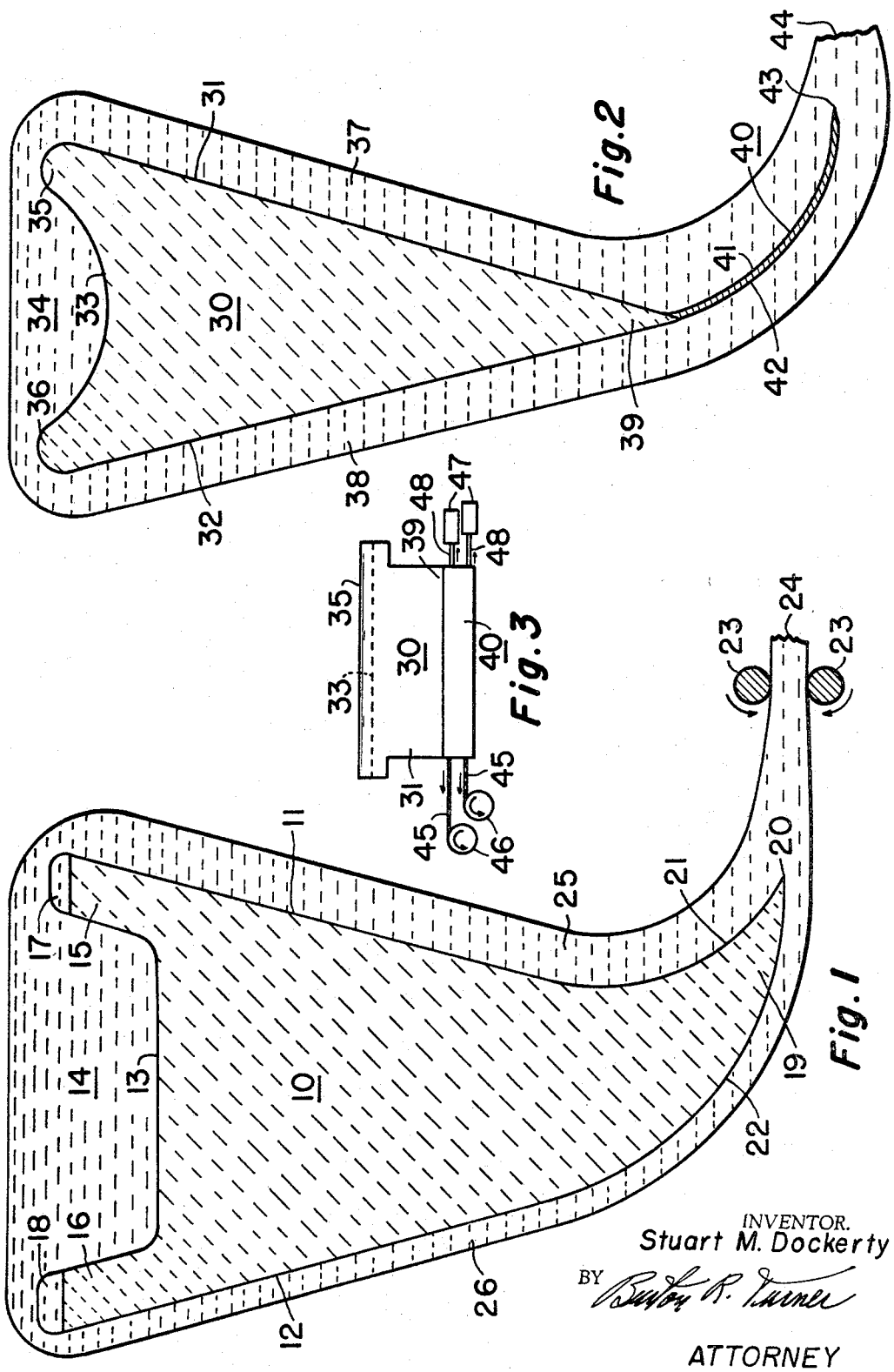

3,433,613
SHEET GLASS FORMING APPARATUS WITH MEANS TO TRANSFORM VERTICAL FLOWS INTO A HORIZONTAL FLOW
Stuart M. Dockerty, Corning, N.Y., assignor to Corning Glass Works, Corning, N.Y., a corporation of New York
Filed Jan. 26, 1966, Ser. No. 523,119
U.S. Cl. 65—145 3 Claims
Int. Cl. C03 17/00

ABSTRACT OF THE DISCLOSURE

In the formation of sheet glass by the downdraw process, the downdraw flow of molten glass is transformed into a substantially horizontal draw by providing an arcuate or curvilinear internal support path for the molten glass, to thus facilitate the horizontal draw of newly formed sheet glass without contacting external surface portions thereof.

---

This invention relates to a novel method and apparatus for forming sheet glass, and more particularly to the forming of sheet glass by the downward flow of molten glass and conveying such molten glass through an arc for facilitating the horizontal draw of the thus formed sheet glass.

It has been known in the past to form sheet glass by the downward flow of molten glass over a forming wedge. However, in order to preserve the integrity of the virgin surfaces produced by such process, it has been necessary to anneal the sheet glass while in the vertical plane of its draw, thus requiring extensive and cumbersome installations. Attempts have been made, such as shown in U.S. Patent Nos. 1,836,394 and 1,891,373 to deflect or divert the sheet glass from its vertical plane of draw to a horizontal plane in order to simplify the installation and provide a horizontal annealing lehr.

These attempts, however, have not been completely satisfactory since the main advantage of virgin-surfaced sheet glass of substantially fire polished quality produced by the overflow-wedge process, is defeated by the deflector rollers or plates of the prior art apparatus. That is, since the sheet must still be in a plastic or semimolten condition after it is formed in order to bend about the curvature provided by the rollers or deflecting plates, the virgin surface of the sheet is destroyed through contact with the rollers or deflecting plates, which inherently abrade the surface and produce chipping, scratching, and other surface defects in the sheet.

The present invention obviates the problems heretofore encountered in the industry in transforming the downward flow of molten glass into a substantially horizontal draw by providing an arcuate or curvilinear path for the molten glass without contacting the outer surface portions of the glass. The forming member per se may be utilized to transform the downward flow of the molten glass into a horizontal flow, while still in a molten condition, and thereby facilitate a horizontal draw without imparting surface defects to the virgin surfaces of the sheet as it is formed.

It thus has been an object of the invention to provide a novel method and apparatus for transforming a customary vertical draw sheet glass process into a horizontal draw, while the glass is still molten, to form glass sheet without imparting defects to the surfaces thereof during such transformation.

A further object of the invention has been to provide a curvilinear or arcuate path for molten glass flowing downwardly along a forming wedge so as to transform the downward flow into a horizontal flow, while still in a molten condition, to horizontally draw sheet glass having virgin surfaces.

These and other objects of the invention will become more apparent to those skilled in the art from the following disclosure and accompanying drawings in which:

FIG. 1 is a schematic side elevational view in section illustrating an embodiment of the invention;

FIG. 2 is a schematic side elevational view in section illustrating a further embodiment of the invention; and FIG. 3 is a schematic front elevational view of the embodiment shown in FIG. 2, illustrating the utilization of tensioning means adjacent the root or transformation bar thereof.

Referring now to the drawings, and particularly FIG. 1, a refractory forming member or overflow wedge 10 is shown having a pair of downwardly converging surface portions 11, 12. The upper surface of the forming member 10 is provided with an overflow trough 13 for overflowing molten glass 14 over bounding walls 15, 16 and downwardly along surface portions 11 and 12. If desired, adjustable weirs 17, 18 may be provided along the upper edges of bounding walls 15, 16 respectively in order to proportion the flow along the forming surfaces 11 and 12.

The root or lower vertex 19 of the forming member 10 terminates in a horizontal line edge 20 which lies a vertical plane parallel to and horizontally offset from the vertical plane passing through the longitudinal axis of the trough 13. As shown, the forming surface 11 is provided with a concave curvature 21 adjacent the root portion 19 of the forming member 10, whereas the forming surface 12 is provided with a convex curvature 22. The arcuate or curvatured surfaces 21 and 22 converge at the lower vertex into horizontal line edge 20 from which sheet glass 24 is horizontally drawn by any suitable means such as edge rollers 23.

The molten glass 14 delivered to trough 13 overflows the opposite edges of the bounding walls 15, 16 in separate flow paths 25, 26 along the converging forming surface portions 11 and 12 respectively. The molten glass flowing downwardly along paths 25 and 26 is transformed into a horizontal flow by means of the concave arcuate or curvilinear surface 21 and convex arcuate or curvilinear surface 22 respectively. As the flows 25 and 26 of molten glass reach the horizontal line edge 20, they unite to form sheet glass having virgin outer surfaces positioned for a horizontal draw. If desired, the weirs 17, 18 may be adjusted so as to control the proportionment of flow along paths 25 and 26 respectively to give a lower flow rate along forming surface 12 and the bottom or convex arcuate surface 22.

Referring now to FIGS. 2 and 3, a further embodiment of the invention is shown comprising a forming member or overflow wedge 30 of suitable refractory material having downwardly converging forming surface portions 31, 32. The upper surface of the forming member is provided with an overflow trough 33 having molten glass 34 therewithin. The trough 33 is provided with bounding walls 35, 36 over which the molten glass 34 is allowed to overflow into separate flow paths 37, 38 downwardly along forming surfaces 31 and 32 respectively. If desired, the bounding walls 35 and 36 may be provided with adjustable weirs to control the proportionment of flow downwardly along the forming surfaces 31 and 32.

The root portion or lower vertex 39 of the forming member 30 is provided with a curvilinear or arcuate metallic sheet member 40 having a concave arcuate surface 41 and a convex arcuate surface 42. The curvilinear sheet member 40 is preferably made of platinum, platinum alloy, or platinum clad molybdenum and is integrally secured to the root portion 39 of the forming member 30. Sheet member 40 terminates at its lower end in a horizontal line edge 43 which lies within a vertical plane parallel to and horizontally offset from the vertical plane passing through the longitudinal axis of the trough 33.

The embodiment of FIGS. 2 and 3 operate in a similar manner to the embodiment shown in FIG. 1. It can be seen that the concave arcuate or curvatured surface 41 is an extension of the converging forming surface 31, and that the convex arcuate or curvatured surface 42 is an extension of the converging forming surface 32. The molten glass 34 is permitted to overflow the upper edges of opposed bounding walls 35, 36 as separate flow paths 37, 38 along downwardly converging forming surface portions 31 and 32 respectively. As the molten glass proceeds downwardly along flow paths 37 and 38 they are transformed into a horizontal flow path by means of the curvilinear or arcuate sheet member 40 provided with concave surface 41 and convex surface 42 which terminate in the horizontal line edge 43. The separate flow paths 37 and 38 unite into a single flow adjacent the line edge 43 which is horizontally drawn off as sheet glass 44 having virgin outer surfaces.

In order to maintain the desired curvature in the sheet member 40, tension is applied to the opposite edges thereof by any suitable manner. As shown in FIG. 3, the tension may be applied by a cable 45 which is wound around a tension drum 46. On the other hand, the tension may be applied by a cylinder and piston arrangement, wherein the piston is activated upon by a cylinder 47 and a piston rod 48 connected to the edge of the curvilinear sheet member 40. By so tensioning the sheet member, it is possible to exert fairly heavy loads thereon without serious deformation.

Although I have disclosed the now preferred embodiments of my invention, it will be apparent to those skilled in the art that various changes and modifications may be made thereto without departing from the spirit and scope thereof as defined in the appended claims.

I claim:

1. Apparatus for forming sheet glass comprising a forming member having an upwardly open overflow trough for molten glass and a pair of downwardly converging forming surface portions for receiving separate flows of molten glass from the overflow trough, internal support means formed integrally with the lower end of said forming member for transforming the flows of molten glass into a substantially horizontal path, said internal support means including a curved extension portion having a pair of spaced-apart arcuate surfaces each communicating with one of said converging forming surface portions and terminating at their lower end in a substantially horiztonal line edge, and said line edge lying within a vertical plane parallel to and horizontally offset from the vertical plane passing through a longitudinal axis of said overflow trough.

2. Apparatus as defined in claim 1 wherein said internal support means is in the form of a curvilinear sheet member integrally connected to a root portion of said forming member, and said sheet member has curved surfaces continuous with said forming surface portions which terminate in said horizontal line edge for facilitating the horiztonal draw of sheet glass therefrom.

3. In apparatus for forming sheet glass including a forming member having an upwardly-open overflow trough for molten glass and a pair of downwardly converging forming surface portions for receiving separate flows of molten glass from the overflow trough; the combination comprising a curvilinear sheet member integrally connected to a root portion of said forming member and having curved surfaces which terminate in an offset horizontal line edge for facilitating the horizontal draw of sheet glass therefrom; and tension means provided on each side of said sheet member to maintain a desired curvature and minimize deformation of the sheet member.

References Cited

UNITED STATES PATENTS

| | | | |
|---|---|---|---|
| 1,565,319 | 12/1925 | Fowle | 65—53 |
| 1,739,960 | 12/1929 | Ferngren | 65—53 |
| 1,984,942 | 12/1934 | Owen | 65—145 |
| 3,338,696 | 8/1967 | Dockerty | 65—145 |

OTHER REFERENCES

Smith on Patent Law, pages 218–219 Sections 183–186.

DONALL H. SYLVESTER, *Primary Examiner.*

R. V. FISHER, *Assistant Examiner.*

U.S. Cl. X.R.

65—121, 53, 195